United States Patent
Chu et al.

(10) Patent No.: US 9,461,345 B2
(45) Date of Patent: Oct. 4, 2016

(54) SECONDARY BATTERY

(71) Applicant: Polytronics Technology Corp., Hsinchu (TW)

(72) Inventors: Fu Hua Chu, Taipei (TW); David Shau Chew Wang, Taipei (TW); Chun Teng Tseng, Sanwan Township, Miaoli County (TW)

(73) Assignee: POLYTRONICS TECHNOLOGY CORP., Hsinchu (TW)

( * ) Notice: Subject to any disclaimer, the term of this patent is extended or adjusted under 35 U.S.C. 154(b) by 0 days.

(21) Appl. No.: 14/754,246

(22) Filed: Jun. 29, 2015

(65) Prior Publication Data

US 2016/0079638 A1 Mar. 17, 2016

(30) Foreign Application Priority Data

Sep. 12, 2014 (TW) ............................. 103131522 A

(51) Int. Cl.
*H01M 10/637* (2014.01)

(52) U.S. Cl.
CPC ....... *H01M 10/637* (2015.04); *H01M 2220/30* (2013.01)

(58) Field of Classification Search
CPC .................................................. H01M 10/637
See application file for complete search history.

(56) References Cited

FOREIGN PATENT DOCUMENTS

| TW | 395622 U | 6/2000 |
|---|---|---|
| TW | I440244 B | 6/2014 |

*Primary Examiner* — Helen O Conley
(74) *Attorney, Agent, or Firm* — Muncy, Geissler, Olds & Lowe, P.C.

(57) ABSTRACT

A secondary battery supplying electrical power to a load comprises a battery unit, at least one PTC temperature sensing device and a load switch. The battery unit is encompassed by a battery shell. The PTC temperature sensing device is disposed on a primary surface of the battery shell to effectively sense a temperature of the battery unit. The load switch connects to the battery unit and a load and determines whether the battery unit and the load switch are in electrical connection or in an open circuit state upon resistance variation of the PTC temperature sensing device. When the resistance of the PTC temperature sensing device increases by a threshold times within a specific temperature variation or time period, the load switch receives a control signal and accordingly switches to an open circuit state.

15 Claims, 5 Drawing Sheets

SECONDARY BATTERY

BACKGROUND OF THE INVENTION (1) Field of the Invention

The present application relates to a secondary battery, and more specifically, to a secondary battery with over-temperature protection function.

(2) Description of the Related Art

Batteries have been widely used in daily life. In particular, rechargeable secondary batteries are extensively applied to portable electronic apparatuses, e.g., mobile phones. Because lithium batteries have higher voltages and more recharging times compared to traditional nickel-cadmium batteries or nickel-metal hydride (NiMH) batteries, lithium batteries are increasingly demanded. The batteries of rectangular shapes are usually thin, and therefore are easily applied to various products such as mobile phones or digital cameras. The lithium secondary batteries have high energy densities and discharging voltages, and thus are suitably applied to extensive products.

Although lithium secondary batteries are advantageous in comparison with the traditional nickel-cadmium and nickel-metal hydride batteries, the batteries may expand or deform due to high internal pressures of the batteries caused by over-charge or high-temperature. Therefore, the insulation film of the battery may be cleaved and as a result short circuit may occur when the battery is deformed in an event of abnormal temperature or pressure. The battery may be deformed when internal pressure rises, and may be exploded or blown if deformation is serious.

To solve the problem, mechanical sensing technology, piezoelectric sensor, strain gauge could be employed to detect over-temperature or expansion of the battery. Over-temperature and deformation would incur unrecoverable dangerous event instantaneously, and therefore it is necessary to increase sensitivity of detection to accurately, effectively and instantly sense over-temperature.

SUMMARY OF THE INVENTION

The present application devises a secondary battery with over-temperature protection function, so as to sense temperature variation of the secondary battery. In an over-temperature event, the electrical power of the secondary battery can be cut off to prevent the secondary battery from excessive deformation, explosion and burnout. In the present application, one or more positive temperature coefficient (PTC) thermistors serve as temperature sensing devices which are placed at appropriate locations to enhance accuracy and sensitivity of detection, so as to provide precise and instant over-temperature protection.

In an aspect of the present application, a secondary battery is devised to supply electrical power to a load. In an embodiment, a secondary battery comprises a battery unit, at least one PTC temperature sensing device and a load switch. The battery unit is encompassed by a battery shell. The PTC temperature sensing device is disposed on a primary surface of the battery shell to effectively sense a temperature of the battery unit. The load switch connects to the battery unit and a load and is configured to determine whether the battery unit and the load switch are in electrical connection or in an open circuit state based on resistance variation of the PTC temperature sensing device. When the resistance of the PTC temperature sensing device increases by a threshold times within a specific temperature variation or time period, the load switch receives a control signal and accordingly switches to an open circuit state.

The PTC temperature sensing device may be in contact with the primary surface of the battery shell, and a thermally conductive paste may be introduced therebetween as an interface material.

In an embodiment, the PTC temperature sensing device is disposed in a central area of the primary surface. The central area may comprise 20-40% of the primary surface.

In an embodiment, the battery unit is in square, rectangular or circular shape, and the primary surface is the largest surface of the battery shell.

In an embodiment, the PTC temperature sensing device may be a wire or strip device comprising a plurality of PTC thermistors in series connection, and may be disposed along a diagonal of the primary surface of the battery shell.

In an embodiment, the secondary battery comprises two PTC temperature sensing devices, and each of them is a wire or strip device comprising a plurality of PTC thermistors in series connection. The two PTC temperature sensing devices intersect and are disposed along two diagonals of the primary surface of the battery shell. The two PTC temperature sensing devices may comprise a shared PTC thermistor at the intersection.

In an embodiment, the temperature variation is a temperature rise of 3-5° C. and the threshold times is 10 times.

In an embodiment, the time period is 0.5-50 milliseconds, and the threshold times is 10 times.

In an embodiment, the PTC temperature sensing device comprises at least one PTC thermistor which may be a polymeric PTC thermistor.

In an embodiment, the PTC thermistor has a trip temperature about 60-90° C.

In an embodiment, the load switch is a load-switch IC. The PTC temperature sensing device connects to a control pin of the load-switch IC.

In an embodiment, the secondary battery further comprises a control unit connecting to the PTC temperature sensing device which detects resistance variation of the PTC temperature sensing device, and control unit accordingly generates a control signal to the load-switch IC. For example, the load-switch IC may be a normally closed switch such as PMOS transistor which will generate a signal of high level voltage to make the load-switch IC be an open circuit when the control unit detects the resistance of the PTC temperature sensing device increases significantly.

The heat generated by the battery unit usually concentrates in the central area, and therefore the PTC temperature sensing device placed at the central area can instantly and effectively sense temperature variation of the battery unit. Even if high-temperature does not occur in the central area due to design or manufacturing variation, one or more PTC temperature sensing wires or strips can be disposed along one or more diagonals to provide effective and overall temperature sensing. By accurate and instant over-temperature detection, the excessive expansion or deformation can be avoided, thereby preventing the battery from explosion and burnout to increase safety of product in use.

BRIEF DESCRIPTION OF THE DRAWINGS

The present application will be described according to the appended drawings in which.

DETAILED DESCRIPTION OF THE INVENTION

The making and using of the presently preferred illustrative embodiments are discussed in detail below. It should be appreciated, however, that the present application provides many applicable inventive concepts that can be embodied in a wide variety of specific contexts. The specific illustrative embodiments discussed are merely illustrative of specific ways to make and use the invention, and do not limit the scope of the invention.

Figure 1A:
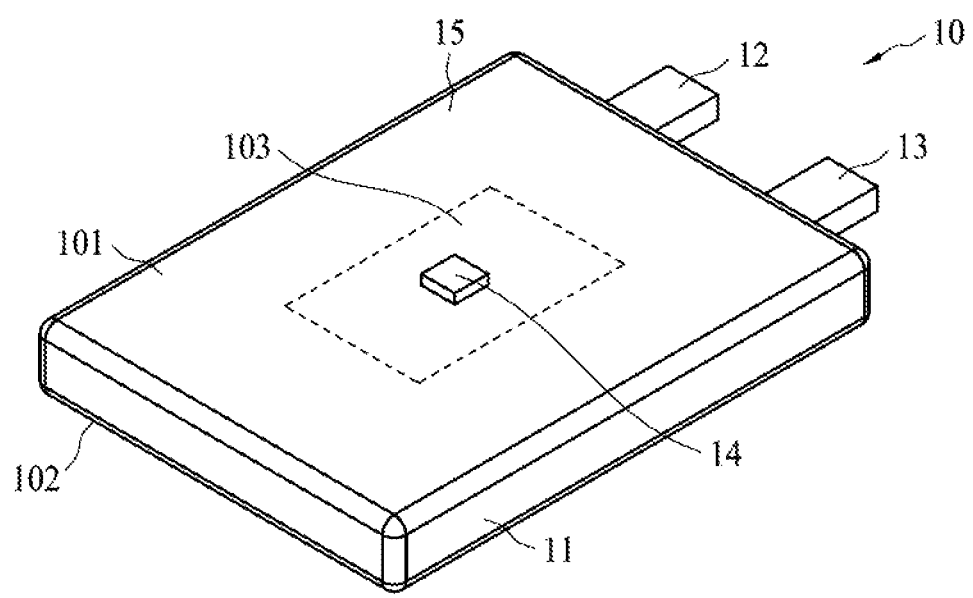
FIGS. 1A and 1B show a secondary battery in accordance with a first embodiment of the present application.
Figure 1B:
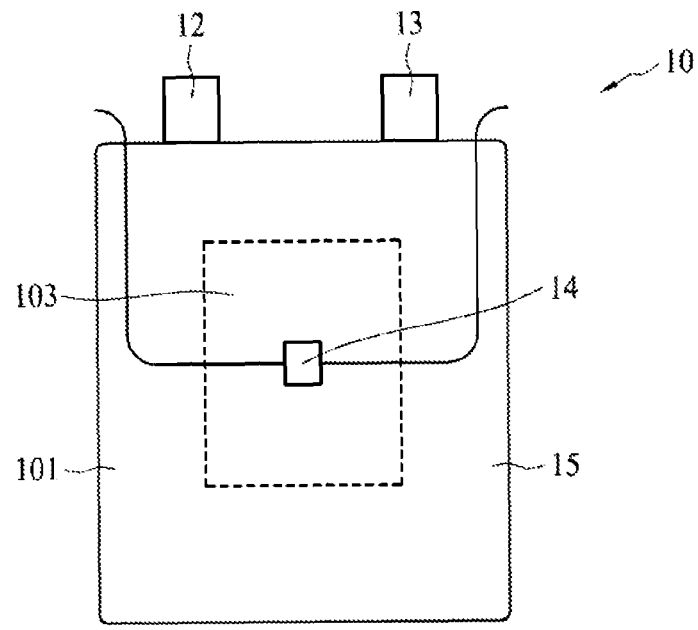

In the present application, a secondary battery capable of detecting abnormal battery expansion is devised. FIG. 1A shows a perspective view of a secondary battery 10, and FIG. 1B shows a top view of the secondary battery 10. The secondary battery 10 comprises a battery unit 11 encompassed by a battery shell 15, and a positive electrode 12 and a negative electrode 13 sticking out from a front end of the battery unit 11. The battery unit 11 may be of a rectangular shape, and the positive electrode 12 and negative electrode 13 may be of other shapes to connect to a protective circuit module (PCM). The battery shell 15 has opposite primary surfaces 101 and 102 which are the largest area of the battery shell 15. In this embodiment, a PTC temperature sensing device 14 is disposed on a central area 103 of the primary surface 101, and the central area 103 may comprise 20-40%, 25%, 30% or 35%, of the area of the primary surface. As shown in FIG. 1B, the PTC temperature sensing device 14 may connect to external sensing and control circuit by conducting wires. When the resistance of the PTC temperature sensing device 14 increases to a threshold value or increases by a threshold times, it indicates that the central surface area of the battery shell 15 is in over-temperature state and the current flowing therethrough has to be severed instantly to protect the battery unit 11. In operation, thermal expansion would be more obvious in the central area 103 of the battery unit 11, and the central area 103 accumulates a lot of heat and therefore usually exhibits the highest temperature. In view of the above, in the present application the PTC temperature sensing device 14 is preferably disposed in the central area 103 of the primary surface 101 to precisely and instantly sense the temperature of the battery unit 11.

However, the batteries may have variation during manufacturing, and as a result the hottest area is another area rather than the central area. Therefore, the arrangement of the PTC temperature sensing device 14 shown in FIGS. 1A and 1B may be unable to accurately sense abnormal temperature or expansion.

Figure 2:
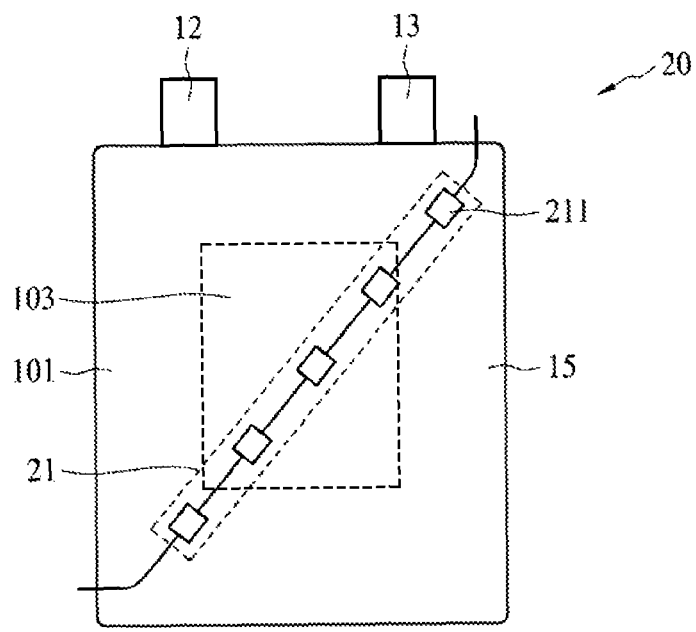
FIG. 2 shows a secondary battery in accordance with a second embodiment of the present application.

FIG. 2 shows another disposition of the PTC temperature sensing device. A secondary battery 20 comprises PTC thermistors 211 in series connection and disposed along a diagonal from upper right to the lower left of the primary surface 101 of the battery shell 15. More specifically, a primary surface 101 of the battery shell 15 is provided with a strip-shaped PTC temperature sensing device 21 comprising the PTC thermistors 211 in contact with the primary surface 101 of the battery shell 15. The PTC thermistors 211 are evenly disposed along the diagonal with approximately equivalent intervals, in which three PTC thermistors 211 are within the central area 103. In practice, the central area 101 of the battery shell 15 usually has higher temperature, and at least one PTC thermistor 211 of the PTC temperature sensing device 21 is preferably disposed within the central area 103 of the primary surface 101 to ensure sensitivity and correctness of temperature detection.

Figure 3:
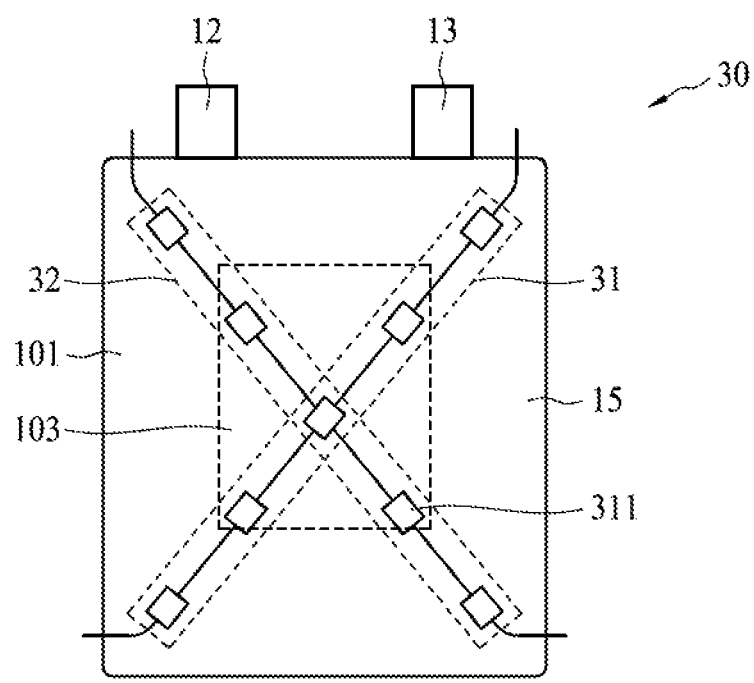
FIG. 3 shows a secondary battery in accordance with a third embodiment of the present application.

In FIG. 3, a secondary battery 30 comprises a battery shell 15 having a primary surface 101 on which a PTC temperature sensing device 31 is disposed along the upper right to lower left diagonal and another PTC temperature sensing device 32 is disposed along the upper left to lower right diagonal. The PTC temperature sensing devices 31 and 32 intersect and are disposed along the two diagonals. The PTC temperature sensing device 31 comprises a plurality of PTC thermistors 311 in series connection, and the PTC thermistors 311 are evenly disposed along the diagonal with approximately equivalent intervals. In this embodiment, three PTC thermistors 311 of the PTC temperature sensing devices 31 are disposed within the central area 103. The PTC temperature sensing device 32 comprises a plurality of PTC thermistors 311 in series connection, and the PTC thermistors 311 are evenly disposed along the diagonal with approximately equivalent intervals. In this embodiment, three PTC thermistors 311 of the PTC temperature sensing devices 32 are disposed within the central area 103. In practice, the central area 103 of the primary surface 101 of the battery shell 15 usually has higher temperature, and at least one PTC thermistor 311 of the PTC temperature sensing devices 31 and 32 is preferably disposed within the central area 103 of the primary surface 101 to ensure sensitivity and correctness of temperature detection. The PTC temperature sensing devices 31 and 32 may be independent or individual elements, or the PTC thermistor 311 at the intersection is shared for both PTC temperature sensing devices 31 and 32 that is, such PTC thermistor 311 is in common use for the two devices 31 and 32. In an embodiment, the PTC temperature sensing devices 31 and 32 are connected in series to form a temperature sensing module which is able to determine abnormal temperature by detecting resistance change of the temperature sensing module. If the PTC thermistor 311 at the diagonal intersection is shared for both PTC temperature sensing devices 31 and 32, conductive wires can connect to any two of the four ends of the PTC temperature sensing devices 31 and 32 as desired to form effective diagonal or V-shape arrangement of the PTC thermistors 311. Alternatively, two PTC temperature sensing wires or strips can be of a cross shape to form a temperature sensing module.

In addition to rectangular and square shape, the design of the present application can be applied to others such as circular shape battery, e.g., 18650 type, as long as the PTC temperature sensing device or temperature sensing nodule can effectively sense the temperature of the battery unit. In addition the diagonal or V-shape arrangement, a plurality of PTC thermistors can be evenly disposed on the primary surface of the battery in an array distribution to sense battery temperature comprehensively.

The PTC temperature sensing devices 21, 31 and 32 may be formed by a flexible printed circuit (FPC), and the PTC thermistors 211 or 311 may be made by PTC ink. The FPC may be made to protrude the battery unit 11, and the portion sticking out of the battery unit 11 is designed be pulled to easily take the battery unit 11 out of an electronic apparatus.

Figure 4:
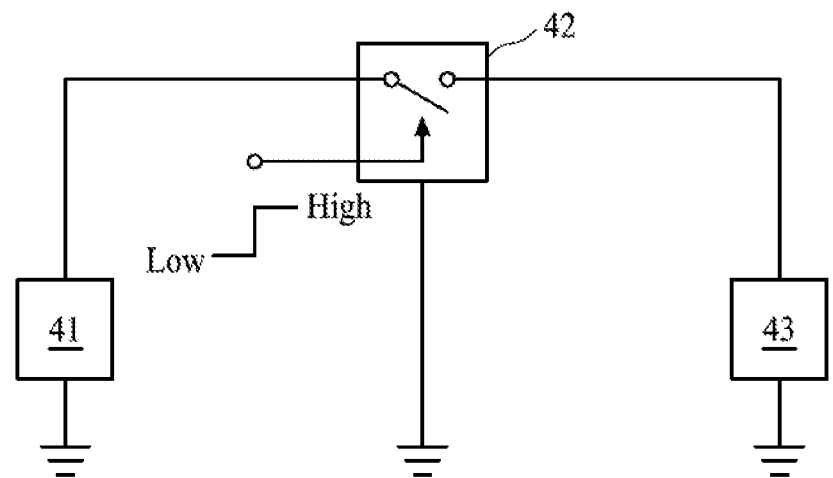
FIG. 4 shows a circuit diagram of a secondary battery in accordance with the present application.

FIG. 4 shows a circuit diagram of a secondary battery with a load in accordance with an embodiment of the present application. A load switch 42 connects to a battery unit 41 and a load 43 to control the path between the battery unit 41 and the load 43 in a conductive state or an open circuit state. The load switch 42 receives a signal from a PTC temperature sensing device, and determines its state to be closed-circuit or open-circuit upon high or low level voltage of the signal. The load switch 42 may be a normally closed type, e.g., a pnp transistor or MOS field effect transistor, or a normally open type, e.g., a npn transistor or NMOS field effect transistor. The load switch 42 is controlled by a control signal of high or low level voltage as desired.

Figure 5:
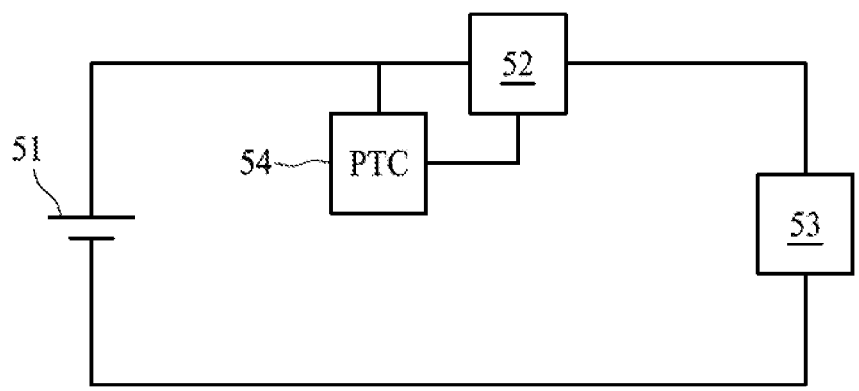
FIG. 5 shows a circuit block diagram of a secondary battery in accordance with an embodiment of the present application.

In FIG. 5, a battery unit 51 supplies electrical power to a load 53, and a load switch 52 is disposed therebetween to determine electrical connection or open-circuit state between the battery unit 51 and the load 53. A PTC temperature sensing device 54 has an end connecting to a positive electrode of the battery unit 51, and another end of the device 54 connects to a control pin of the load switch 52. As such, the PTC temperature sensing device 54 is disposed in a conducting control path rather the path the battery unit 51 supplying electrical power to the load 53. In an embodiment, the load switch 52 may be an npn transistor or NMOS field effect transistor. That is, it is a closed circuit when the control signal is of a high level voltage, and is an open circuit when the control signal is of a low level voltage. When the battery unit 51 operates normally, the PTC temperature sensing device 54 has a low resistance allowing current flowing therethrough and the load switch 52 receives a high-level voltage signal upon which it is in a closed circuit state. Because the resistance of the load switch 52 in a closed circuit state is smaller than that of the PTC temperature sensing device 54, most current will flow through the load switch 52 so that the battery unit 51 can supply electrical power to the load normally. When the battery unit 51 expands due to high-temperature, the temperature of the PTC temperature sensing device 54 capable of sensing the temperature of the battery unit 51 rises and the resistance of the PTC temperature sensing device 54 increases accordingly to reduce current passing therethrough. When the resistance of the PTC temperature sensing device 54 increases rapidly to a threshold value or by a threshold times, e.g., trip, the load switch 52 receives a control signal of a low level voltage and changes to an open-circuit state. Accordingly, the battery unit 51 no longer outputs current and therefore the battery unit 51 is prevented from explosion or burnout. In this embodiment, the PTC temperature sensing device 54 and the load switch 52 may act like a relay switch.

Figure 6:
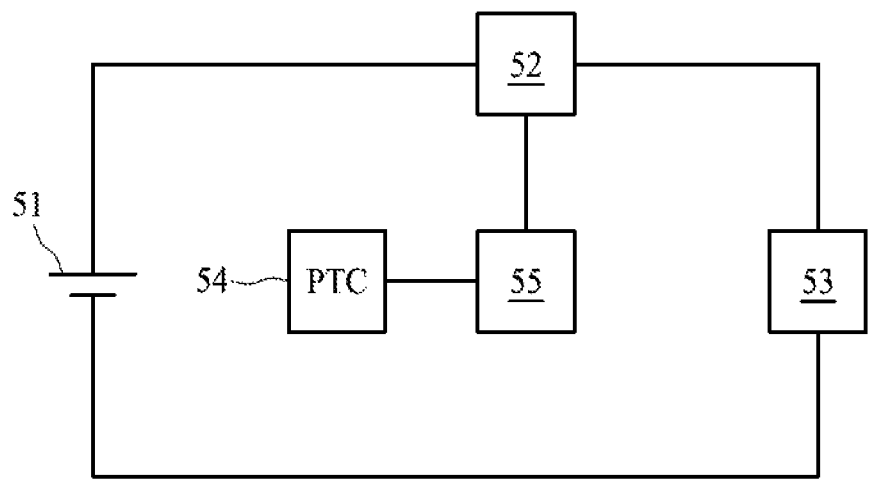
FIG. 6 shows a circuit block diagram of a secondary battery in accordance with another embodiment of the present application.

In FIG. 6, a control unit 55 may be disposed between the PTC temperature sensing device 54 and the load switch 52, and the control unit 55 can proceed with sophisticated logic control by an algorithm of an embedded firmware. The control unit 55 calculates and determines to generate a control signal to the load switch 52 upon a signal sensed by the PTC temperature sensing device 54. When the battery unit 51 operates normally, the control unit 55 sends a high level voltage signal to make the load switch 52 conductive and therefore the battery unit 51 can supply electrical power to the load 53 continuously. When the resistance of the PTC temperature sensing device 54 increases by a threshold times within a specific temperature variation or time period, the load switch 52 receives a control signal from the control unit 55 and accordingly switches to an open circuit state. In an embodiment, when the resistance of the PTC temperature sensing device 54 increases by 10 times, 20 times, 30 times, 50 times or 100 times within a temperature rise of 3-5° C., e.g., resistance increase of 10 times within a temperature rise of 4° C. or the resistance increases by 10 times, 20 times, 30 times, 50 times or 100 times within 0.5-50 milliseconds, e.g., resistance increase of 10 times within 5 milliseconds, the PTC thermistor thereof reaches trip temperature and its resistance rises tremendously, it is viewed an abnormal temperature event. Therefore, the control unit 55 sends a control signal of low level voltage to the load switch 52 to make the load switch 52 be open circuit state so as to provide overheat protection of the battery unit 51. In other words, when the PTC temperature sensing device 54 senses a temperature exceeding a threshold temperature, e.g., resistance increase by a threshold times within specific temperature variation or a short time period, it is viewed over-temperature of the battery unit 51 and current has to be cut off or reduced instantly. The PTC thermistors of different trip temperatures can be selected as desired to meet the requirement of protection mechanism triggering at different temperatures.

The PTC temperature sensing device may comprise one or more polymeric PTC thermistors, of which the trip temperature depends upon polymeric material. For example, a PTC thermistor using low density polyethylene (LDPE) would have lower trip temperatures. In an embodiment, the PTC temperature sensing device may have a trip temperature of 60-90° C., and as a result the over-temperature protection will be activated when the temperature reaches 60-90° C. e.g., 70° C. or 80° C.

The load switch 52 may use load-switch integrated circuit (IC) having over-temperature protection function. That is, the function of the control unit 55 is integrated into the load-switch IC. The PTC temperature sensing device 54 connects to a control pin of the load-switch IC.

By virtue of accurate trip temperature design, one or more PTC thermistors serve as sensors for the PTC temperature sensing device to effectively detect abnormal temperature of a battery unit, thereby cutting off power supply instantly for over-temperature protection. Moreover, the present application discloses effective arrangements or locations of the PTC temperature sensing devices to accurately and comprehensively detect the temperatures of the battery unit for various designs and applications.

The above-described embodiments of the present application are intended to be illustrative only. Numerous alternative embodiments may be devised by persons skilled in the art without departing from the scope of the following claims.

What is claimed is:

1. A secondary battery supplying electrical power to a load, comprising:
  a battery unit encompassed by a battery shell;
  at least one PTC temperature sensing device disposed on a primary surface of the battery shell to effectively sense a temperature of the battery unit; and
  a load switch connecting to the battery unit and the load and determining whether the battery unit and the load is in electrical connection or an open circuit state upon resistance variation of the PTC temperature sensing device;
  wherein the load switch receives a control signal to change to an open circuit state when a resistance of the PTC temperature sensing device increases by a threshold times within a specific temperature variation or a time period.

2. The secondary battery of claim 1, wherein the PTC temperature sensing device is disposed on a central area of the primary surface.

3. The secondary battery of claim 2, wherein the central area comprises 20-40% of the primary surface.

4. The secondary battery of claim 1, wherein the battery unit is of square, rectangular or circular shape, and the primary surface is the largest area of the battery shell.

5. The secondary battery of claim 1, wherein the PTC temperature sensing device comprises a plurality of PTC thermistors in series connection in a wire or strip and disposed along a diagonal of the primary surface.

6. The secondary battery of claim 1, wherein two PTC temperature sensing devices intersect and are disposed along two diagonals of the primary surface, and each of the PTC temperature sensing devices comprises a plurality of PTC thermistors in series connection in a wire of strip.

7. The secondary battery of claim 6, wherein the two PTC temperature sensing devices share a PTC thermistor in common use.

8. The secondary battery of claim 1, wherein the temperature variation is a temperature rise of 3-5° C., and the threshold times is 10 times.

9. The secondary battery of claim 1, wherein the time period is 0.5-50 milliseconds, and the threshold times is 10 times.

10. The secondary battery of claim 1, wherein the PTC temperature sensing device comprises at least one PTC thermistor.

11. The secondary battery of claim 10, wherein the PTC thermistor is a polymeric PTC thermistor.

12. The secondary battery of claim 10, wherein the PTC thermistor has a trip temperature of 60-90° C.

13. The secondary battery of claim 1, wherein the PTC temperature sensing device is made by a flexible printed circuit.

14. The secondary battery of claim 1, wherein the load switch is a load-switch IC, and the PTC temperature sensing device connects to a control pin of the load-switch IC.

15. The secondary battery of claim 1, further comprising a control unit connecting to the PTC temperature sensing device so as to send a control signal to the load switch upon the temperature variation of the PTC temperature sensing device.

* * * * *